(12) United States Patent
Shagawa

(10) Patent No.: US 12,044,661 B2
(45) Date of Patent: Jul. 23, 2024

(54) AUTOSAMPLER FOR CHROMATOGRAPH

(71) Applicant: SHIMADZU CORPORATION, Kyoto (JP)

(72) Inventor: Tomohiro Shagawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 415 days.

(21) Appl. No.: 17/634,273

(22) PCT Filed: Aug. 29, 2019

(86) PCT No.: PCT/JP2019/033845
§ 371 (c)(1),
(2) Date: Feb. 10, 2022

(87) PCT Pub. No.: WO2021/038778
PCT Pub. Date: Mar. 4, 2021

(65) Prior Publication Data
US 2022/0283128 A1    Sep. 8, 2022

(51) Int. Cl.
*G01N 30/24*    (2006.01)
*G01N 30/06*    (2006.01)
(Continued)

(52) U.S. Cl.
CPC ............ *G01N 30/24* (2013.01); *G01N 30/06* (2013.01); *G01N 30/88* (2013.01);
(Continued)

(58) Field of Classification Search
CPC ................... G01N 30/24; G01N 2030/027
See application file for complete search history.

(56) References Cited

U.S. PATENT DOCUMENTS

2006/0005640 A1 * 1/2006 Osaka ............ G01N 35/00871
73/863.83

FOREIGN PATENT DOCUMENTS

EP       2546644 A1 *  1/2013 ............ G01N 30/24
JP       01-131457 A    5/1989
(Continued)

OTHER PUBLICATIONS

Notice of Reasons for Refusal in corresponding Japanese Application No. 2021-541888 dated Mar. 7, 2023, with English language machine translation.
(Continued)

*Primary Examiner* — Jamel E Williams
*Assistant Examiner* — Alex T Devito
(74) *Attorney, Agent, or Firm* — Renner, Otto, Boisselle & Sklar, LLP

(57) ABSTRACT

An autosampler fora chromatograph includes a sample injector (2), an information inputter (6), a sequence data creator (8) that creates operating instruction sequence data based on an input injecting condition and saves each of an initial injection sequence, a repetitive injection sequence and a duplicate of the repetitive injection sequence in each of a first data region, a second data region and a third data region, a controller (10) that causes the sample injector (2) to execute a successive injecting operation, a sequence changer (12) that changes a duplicate of the repetitive injection sequence in the third data region based on a changed injecting condition when the changed injecting condition in regard to a repetitive injecting operation is input through the information inputter (6), and a sequence re-writer (14) that rewrites the repetitive injection sequence in the second data region with the repetitive injection sequence in the third data region when the repetitive injection sequence is executed repeatedly.

8 Claims, 3 Drawing Sheets

(51) Int. Cl.
*G01N 30/88* (2006.01)
*G01N 35/10* (2006.01)
*G01N 30/02* (2006.01)

(52) U.S. Cl.
CPC ... *G01N 35/1004* (2013.01); *G01N 2030/027* (2013.01); *G01N 2030/8804* (2013.01)

(56) References Cited

FOREIGN PATENT DOCUMENTS

| | | | | |
|---|---|---|---|---|
| JP | 2015152567 | * | 8/2015 | |
| WO | WO-2012058632 A1 | * | 5/2012 | ............. G01N 27/62 |

OTHER PUBLICATIONS

International Search Report for corresponding Application No. PCT/JP2019/033845, mailed Nov. 19, 2019.
Written Opinion for corresponding Application No. PCT/JP2019/033845, mailed Nov. 19, 2019 (English machine translation).
Extended European Search Report for corresponding European Patent Application No. 19943047.1, dated Apr. 12, 2023.

* cited by examiner

F I G. 1
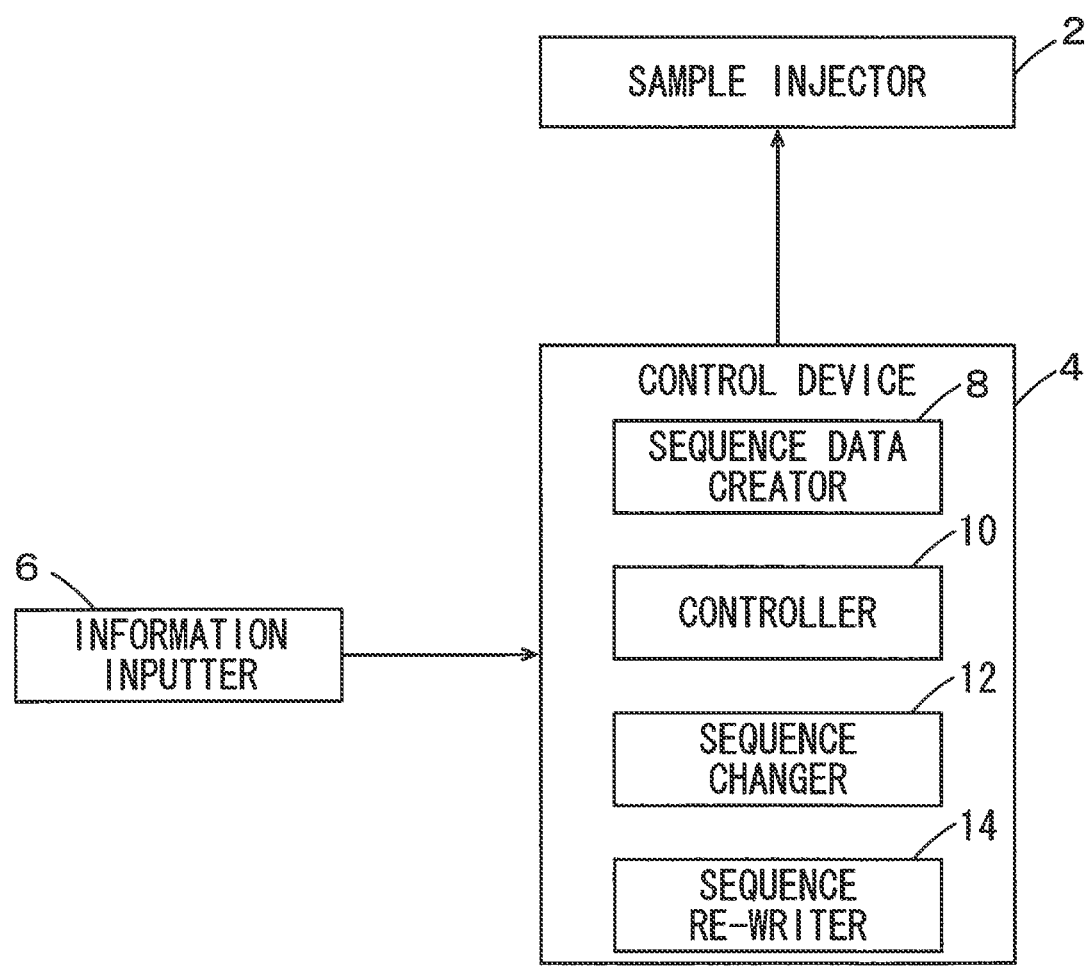

AUTOSAMPLER FOR CHROMATOGRAPH

TECHNICAL FIELD

The present invention relates to an autosampler for a chromatograph.

BACKGROUND ART

In a liquid chromatograph and a supercritical fluid chromatograph, an autosampler that automatically injects a sample into an analysis flow path for chromatography is used. An operation of the autosampler is controlled in accordance with sequence data created in advance. In the sequence data, operating instructions in regard to a pre-processing operation before the sample injection, a sample injecting operation and a post-processing operation after the sample injection ends are written in order. The controller of the autosampler sequentially executes the operating instructions written in the sequence data, whereby the pre-processing operation, the injecting operation and the post-processing operation are executed by the autosampler.

When the user edits the sequence data, the autosampler can execute not only a standard operation of injecting a sample but also various operations such as injecting a sample after diluting the sample or repeatedly executing an injecting operation multiple times. In a case where the same sample is analyzed multiple times, successive injection which is the injection of a next sample to an analysis flow path before a previous analysis ends can be carried out (see Patent Document 1.) In a case where the autosampler carries out successive injection, not only parameters relating to a standard injecting operation such as an injection amount but also parameters such as an injection count, an injection interval and a waiting period of time until the next injection are present in sequence data.

CITATION LIST

Patent Document

[Patent Document 1] JP 1-131457 A

SUMMARY OF INVENTION

Technical Problem

There is a request for changing injecting conditions such as an injection count, an injection interval and a sample injection amount during successive injection carried out by the autosampler. However, the contents of sequence data under execution by the controller of the autosampler cannot be changed. Even if the contents of sequence data under execution can be changed, it is difficult for the controller to determine when the changed contents are to be reflected.

Due to the above-mentioned reasons, with a conventional autosampler, injecting conditions could not be changed during execution of successive injection. Therefore, it was necessary to interrupt an analysis or change a parameter of sequence data after an analysis was performed to the end in order to change an injecting condition for successive injection, and it was a waste of time and a mobile phase. Further, it was necessary for the user to perform the analysis multiple times to find an optimal injecting condition.

The present invention was conceived considering the above-mentioned problems, and an object of the present invention is to enable a change of an injecting condition during execution of successive sample injection.

Solution to Problem

An autosampler for a chromatograph, according to the present invention includes a sample injector that executes an operation of injecting a sample into an analysis flow path for chromatography, an information inputter through which a user inputs an injecting condition in regard to the sample injector, a sequence data creator configured to create sequence data in which an operating instruction for causing the sample injector to execute a successive injecting operation of injecting a same sample multiple times is written, and configured to create an initial injection sequence in which an operating instruction for an initial injecting operation of the successive injecting operation is written to save the initial injection sequence in a first data region, create a repetitive injection sequence in which an operating instruction for a repetitive injecting operation to be executed after the initial injecting operation is written to save the repetitive injection sequence in a second data region, and save a duplicate of the repetitive injection sequence in the second data region in a third data region based on the injecting condition input through the information inputter, a controller that controls the sample injector and is configured to cause the sample injector to execute the successive injecting operation by repeatedly executing the repetitive injection sequence in the second data region until a count of sample injection carried out by the sample injector reaches a set count after the initial injection sequence in the first data region is executed, a sequence changer configured to change the repetitive injection sequence in the third data region based on a changed injecting condition when the changed injecting condition in regard to the repetitive injecting operation is input by the user through the information inputter, and a sequence re-writer configured to rewrite the repetitive injection sequence in the second data region with the repetitive injection sequence in the third data region when the repetitive injection sequence is executed repeatedly.

Here, execution of a sequence by the controller means control of the operation of the sample injector by the controller in accordance with an operating instruction written in sequence data.

Advantageous Effects of Invention

With the autosampler for a chromatograph of the present invention, out of sequence data in which operating instructions for causing a sample injector to execute a successive injecting operation are written, an initial injection sequence in which an operating instruction for an initial injecting operation is saved in a first data region, a repetitive injection sequence in which an operating instruction for a repetitive injecting operation to be executed after the initial injecting operation is saved in a second data region, a duplicate of the repetitive injection sequence in the second data region is saved in a third data region, and contents of the repetitive injection sequence in the third data region are changeable by a user. Further, the controller executes the initial injection sequence in the first data region, and then repeatedly executes the repetitive injection sequence in the second data region until the count of sample injection carried out by the sample injector reaches a set count. On the other hand, the repetitive injection sequence in the second data region is written by the repetitive injection sequence in the third data region when the repetitive injection sequence is executed, and the rewritten repetitive injection sequence is executed by the controller when the next injecting operation is executed. That is, when the contents of the repetitive injection sequence in the third data region are changed during a successive injecting operation executed by the sample injector, the changes are reflected in the injecting operation executed by the sample injector. Therefore, the change of the injecting condition in regard to successive injection during successive sample injection is realized.

BRIEF DESCRIPTION OF THE DRAWINGS

FIG. 1 A block diagram showing one inventive example of an autosampler for a chromatograph.

DESCRIPTION OF EMBODIMENTS

Figure 2:
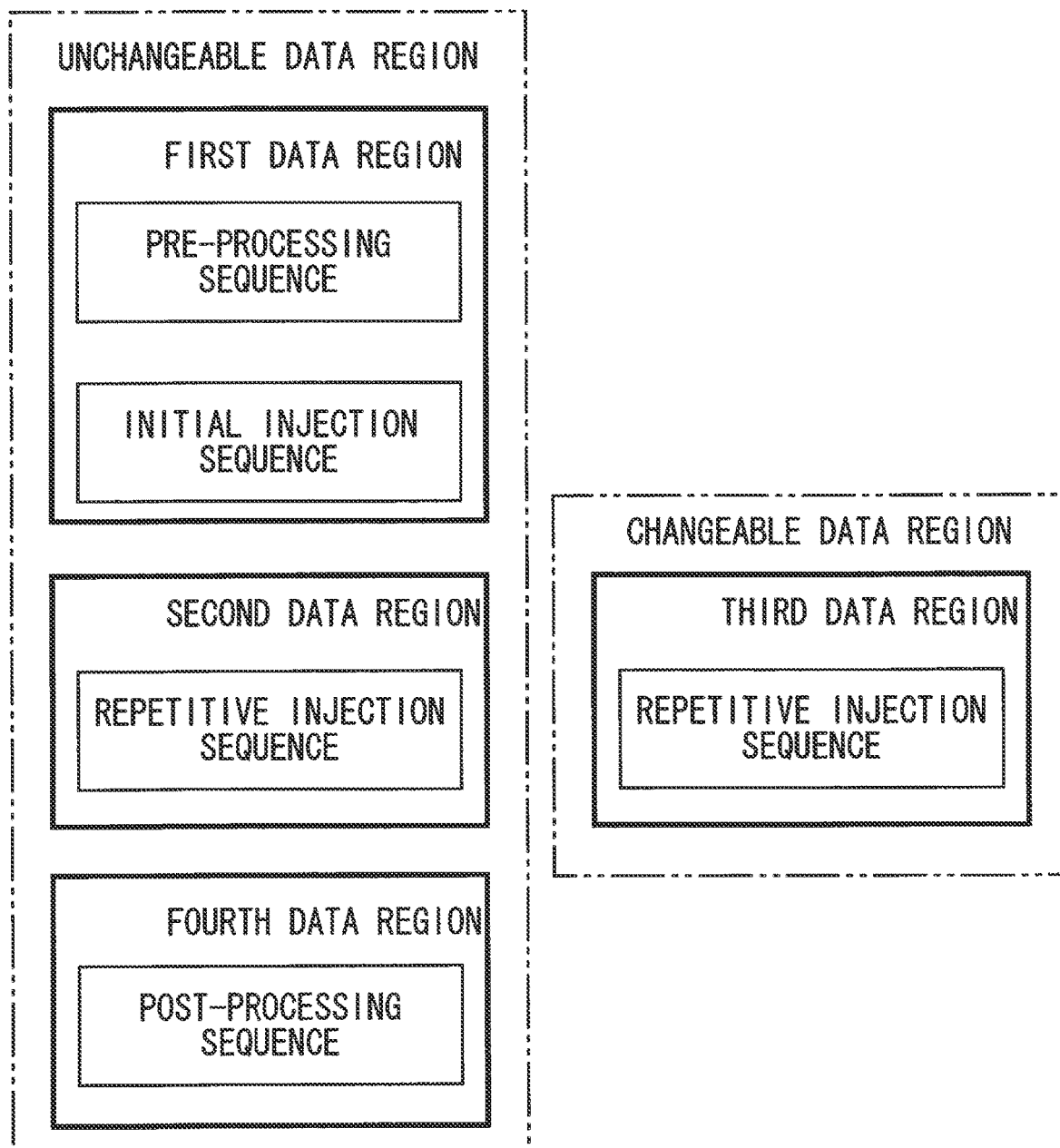
FIG. 2 A diagram showing the data structure of sequence data created by a sequence data creator.

One inventive example of an autosampler fora liquid chromatograph according to the present invention will be described below with reference to the drawings.

As shown in FIG. 1, an autosampler of this inventive example includes a sample injector 2, a control device 4 and an information inputter 6. Although not shown, the sample injector 2 is constituted by a needle for sampling, a syringe pump for sucking a sample through the needle, a sample loop for temporarily holding a sample collected by the needle, a flow path switch valve for switching a flow-path state between a state in which the sample loop is provided in an analysis flow path for liquid chromatography or supercritical fluid chromatography and a state in which the sample loop is not provided in the analysis flow path, etc.

The control device 4 is to control an operation of the sample injector 2 and can be realized by an electronic circuit on which a CPU (Central Processing Unit) and a data storage device are mounted. Various information is input to the control device 4 through the information inputter 6. The information input to the control device 4 through the information inputter 6 includes injecting conditions required for creation of sequence data of the sample injector 2. The injecting conditions include parameters such as a sample injection count, a sample injection amount, an injection interval in successive injection and a sample dilution rate.

The control device 4 includes a sequence data creator 8, a controller 10, a sequence changer 12 and a sequence re-writer 14. The sequence data creator 8, the controller 10, the sequence changer 12 and the sequence re-writer 14 are functions obtained by execution of a predetermined program stored in the data storage device by the CPU.

The sequence data creator 8 is configured to create sequence data for a successive injecting operation executed by the sample injector 2 based on an injecting condition input by a user through the information inputter 6.

As shown in FIG. 2, sequence data created by the sequence data creator 8 includes a pre-processing sequence, an initial injection sequence, a repetitive injection sequence and a post-processing sequence.

A pre-processing sequence defines pre-processing to be executed by the sample injector 2 before a sample injecting operation. In a pre-processing sequence, operating instructions required for execution of pre-processing by the sample injector 2 are written in order. For example, pre-processing includes an operation of cleaning the needle for sampling and an operation of cleaning inside of the flow path connected to the needle.

An initial injection sequence defines an initial injecting operation to be executed by the sample injector 2 after pre-processing. In an initial injection sequence, operating instructions required for execution of an initial injecting operation by the sample injector 2 are written in order. Parameters to be used for creation of an initial injection sequence include a sample injection amount, a sample dilution rate, etc.

A repetitive injection sequence defines an injecting operation to be repeated (hereinafter referred to as a repetitive injecting operation) by the sample injector 2 after an initial injecting operation. In a repetitive injection sequence, operating instructions required for execution of a repetitive injecting operation by the sample injector 2 are written in order. Parameters to be used for creation of a repetitive injection sequence includes a sample injection count, a sample injection amount, an injection interval, a sample dilution rate, etc.

A post-processing sequence defines post-processing to be executed by the sample injector 2 after a set count of sample injecting operation ends. In a post-processing sequence, operating instructions required for execution of post-processing by the sample injector 2 are written in order. Post-processing includes an operation of cleaning the needle for sampling or the flow path, for example.

The sequence data creator 8 is configured to save a created pre-processing sequence and a created initial injection sequence in a first data region of the data storage device, save a repetitive injection sequence in a second data region and save a post-processing sequence in a fourth data region. Further, the sequence data creator 8 is configured to save a duplicate of the repetitive injection sequence saved in the second data region in a third data region.

Contents of sequences saved in the first data region, the second data region and the fourth data region cannot be changed by the user arbitrarily. On the other hand, contents of the repetitive injection sequence saved in the third data region can be changed by the user at any time.

The controller 10 is configured to control an operation of the sample injector 2 by executing sequence data created by the sequence data creator 8. Specifically, the controller 10 executes the pre-processing sequence and the initial injection sequence, and then executes the repetitive injection sequence in the second data region until a sample injection count reaches the count set by the user. For example, in a case where the user sets the sample injection count to m, the controller 10 executes the initial injection sequence and then executes the repetitive injection sequence in the second data region m−1 times. When the sample injection count reaches the set count, the controller 10 executes the post-processing sequence.

The sequence changer 12 is configured to present a parameter item in regard to a changeable injecting condition to the user and prompt the user to change a parameter of a desired item in a case where the user desires to change an injecting condition for a repetitive injecting operation after sequence data is created by the sequence data creator 8. Further, the sequence changer 12 is configured to change the repetitive injection sequence in the third data region based on the parameter of the injecting condition that has been changed by the user.

The sequence re-writer 14 is configured to rewrite (replace) the repetitive injection sequence in the second data region with the repetitive injection sequence in the third data region when the repetitive injection sequence in the second data region is executed by the controller 10.

Figure 3:
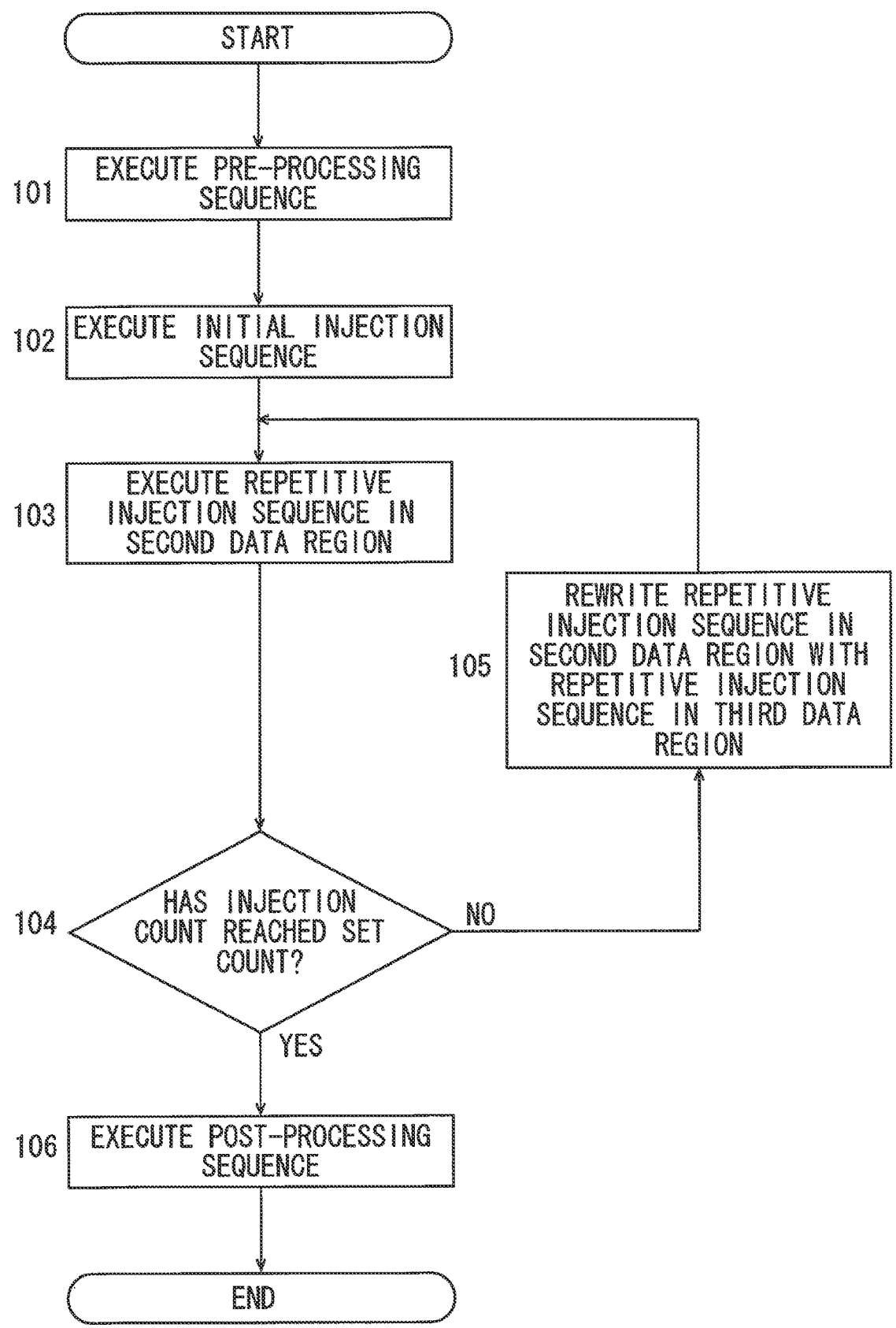
FIG. 3 A flowchart showing one example of an operation of the same inventive example.

A series of operations in regard to sample successive injection will be described with reference to the flowchart of FIG. 3.

When the user inputs a parameter in regard to an injecting condition through the information inputter 6 to the control device 4, the sequence data creator 8 creates sequence data. When the user inputs an instruction for starting an analysis after the sequence data is created, the controller 10 executes a pre-processing sequence saved in the first data region (step 101). Specifically, the controller 10 controls an operation of the sample injector 2 in accordance with an operating instruction written in the pre-processing sequence and causes the sample injector 2 to execute pre-processing.

After a pre-processing operation of the sample injector 2 ends, the controller 10 executes an initial injection sequence saved in the first data region (step 102). Specifically, the controller 10 controls the operation of the sample injector 2 in accordance with an operating instruction written in the initial injection sequence and causes the sample injector 2 to execute an initial injecting operation.

Next, the controller 10 executes a repetitive injection sequence saved in the second data region (step 103). Specifically, the controller 10 controls the operation of the sample injector 2 in accordance with an operating instruction written in the repetitive injecting sequence and causes the sample injector 2 to execute a repetitive injecting operation.

In a case where the count of sample injection carried out by the sample injector 2 does not reach the count set by the user after the sample injector 2 ends the repetitive injecting operation, the sequence re-writer 14 rewrites the repetitive injection sequence in the second data region with a repetitive injection sequence saved in the third data region (step 105). The controller 10 executes the repetitive injection sequence in the second data region that has been rewritten by the sequence re-writer 14 (step 103). This operation is repeated until the sample injection count reaches the count set by the user. When the sample injection count reaches the count set by the user, the controller 10 executes a post-processing sequence saved in the fourth data region (step 106). Specifically, the controller 10 controls the operation of the sample injector 2 in accordance with an operating instruction written in the post-processing sequence, and causes the sample injector 2 to execute post-processing.

Here, since the repetitive injection sequence in the third data region is originally a duplicate of the repetitive injection sequence in the second data region, unless the repetitive injection sequence in the third data region is changed by the sequence changer 12, the sample injector 2 repeats the same repetitive injecting operation. On the other hand, in a case where the contents of the repetitive injection sequence in the third data region are changed by the sequence changer 12 during the n-th injecting operation, the n+1-th injecting operation is executed in accordance with the changed contents. That is, when the user changes an injecting condition in regard to the repetitive injecting operation during an analysis, changes are reflected in the next repetitive injecting operation. Therefore, an injecting condition which has been conventionally unchangeable can be changed during an analysis, and the user can efficiently optimize the injecting condition.

The inventive example described above is merely one example of embodiments of the autosampler for a chromatograph of the present invention. The embodiments of the autosampler for a chromatograph according to the present invention are as follows.

An embodiment of an autosampler for a chromatograph, according to the present invention includes a sample injector that executes an operation of injecting a sample into an analysis flow path for chromatography, an information inputter through which a user inputs an injecting condition in regard to the sample injector, a sequence data creator configured to create sequence data in which an operating instruction for causing the sample injector to execute a successive injecting operation of injecting a same sample multiple times is written, and configured to create an initial injection sequence in which an operating instruction for an initial injecting operation of the successive injecting operation is written to save the initial injection sequence in a first data region, create a repetitive injection sequence in which an operating instruction for a repetitive injecting operation to be executed after the initial injecting operation is written to save the repetitive injection sequence in a second data region, and save a duplicate of the repetitive injection sequence in the second data region in a third data region, based on the injecting condition input through the information inputter, a controller that controls the sample injector and is configured to cause the sample injector to execute the successive injecting operation by repeatedly executing the repetitive injection sequence in the second data region until a count of sample injection carried out by the sample injector reaches a set count after the initial injection sequence in the first data region is executed, a sequence changer configured to change the repetitive injection sequence in the third data region based on a changed injecting condition when the changed injecting condition in regard to the repetitive injecting operation is input by the user through the information in putter, and a sequence re-writer configured to rewrite the repetitive injection sequence in the second data region with the repetitive injection sequence in the third data region when the repetitive injection sequence is executed repeatedly.

In a first aspect of the embodiment of the autosampler for a chromatograph, according to the present invention, the sequence changer is configured to present a changeable parameter item in the repetitive injection sequence in the third region to the user who changes the parameter item, when the user inputs a change instruction in regard to the repetitive injection sequence. With such an aspect, because parameter items that can be changed during an analysis are presented to the user, the user can easily change an injecting condition.

In the above-mentioned first aspect, an injection interval may be included in the changeable parameter item. An injection interval is a period of time from the time when a sample is injected into the analysis flow path until the time when the sample is injected into the analysis flow path next.

In the above-mentioned first aspect, the changeable parameter item may include an amount of sample to be injected into the analysis flow path.

In the above-mentioned first aspect, the changeable parameter item may include a count of liquid types and a type of liquid to be injected into the analysis flow path. A dilute liquid is included as liquid to be injected into the analysis flow path. With such an aspect, it is possible to change or add the count of types of liquid or the type of liquid sucked by the needle for sampling. For example, in a case where a sample is to be injected into the analysis flow path without being diluted in an initial setting, a repetitive injection sequence can be changed such that a dilute liquid is added as liquid to be injected into the analysis flow path. Since such a change causes a change in number of rows in the sequence data, when the controller rewrite the sequence data under execution, it may interfere with the control of the sample injector by the controller. On the other hand, in the present invention, because the repetitive injection sequence in the second data region is rewritten with the repetitive injection sequence in the third data region when the controller executes the repetitive injection sequence in the second data region next after the repetitive injection sequence in the third data region that is not to be executed by the controller is changed, the change can be reflected in the operation of the sample injector without a problem.

In a second aspect of the embodiment of the autosampler for a chromatograph, according to the present invention, the sequence data creator is configured to create a pre-processing sequence in which an operating instruction for a pre-processing operation to be executed by the sample injector before the initial injecting operation is written and save the pre-processing sequence in the first data region.

In the above-mentioned second aspect, the pre-processing operation may include cleaning. Cleaning can include cleaning the needle for sampling, cleaning the inside of the flow path connected to the needle, and so on.

In a third aspect of the embodiment of the autosampler for a chromatograph, according to the present invention, the sequence data creator is configured to create a post-processing sequence in which an operating instruction for a post-processing operation to be executed after the sample injector ends the successive injecting operation is written and save the post-processing sequence in a fourth data region, and the controller is configured to execute the post-processing sequence in the fourth data region after a count of sample injection carried out by the sample injector reaches the set count and cause the sample injector to execute the post-processing operation.

REFERENCE SIGNS LIST

2 Sample injector
4 Control device
6 Information inputter
8 Sequence data creator
10 Controller
12 Sequence changer
14 Sequence re-writer

The invention claimed is:

1. An autosampler fora chromatograph, comprising:
a sample injector that executes an operation of injecting a sample into an analysis flow path for chromatography;
an information inputter through which a user inputs an injecting condition in regard to the sample injector;
a sequence data creator configured to create sequence data in which an operating instruction for causing the sample injector to execute a successive injecting operation of injecting a same sample multiple times is written, and configured to create an initial injection sequence in which an operating instruction for an initial injecting operation of the successive injecting operation is written to save the initial injection sequence in a first data region, create a repetitive injection sequence in which an operating instruction for a repetitive injecting operation to be executed after the initial injecting operation is written to save the repetitive injection sequence in a second data region, and save a duplicate of the repetitive injection sequence in the second data region in a third data region, based on the injecting condition input through the information inputter;
a controller that controls the sample injector and is configured to cause the sample injector to execute the successive injecting operation by repeatedly executing the repetitive injection sequence in the second data region until a count of sample injection carried out by the sample injector reaches a set count after the initial injection sequence in the first data region is executed;
a sequence changer configured to change the repetitive injection sequence in the third data region based on a changed injecting condition when the changed injecting condition in regard to the repetitive injecting operation is input by the user through the information inputter; and
a sequence re-writer configured to rewrite the repetitive injection sequence in the second data region with the repetitive injection sequence in the third data region when the repetitive injection sequence is executed repeatedly.

2. The autosampler fora chromatograph, according to claim 1, wherein
the sequence changer is configured to present a changeable parameter item in the repetitive injection sequence in the third region to the user who changes the parameter item, when the user inputs a change instruction in regard to the repetitive injection sequence.

3. The autosampler for a chromatograph, according to claim 2, wherein
an injection interval is included in the changeable parameter item.

4. The autosampler for a chromatograph, according to claim 2, wherein
the changeable parameter item includes an amount of sample to be injected into the analysis flow path.

5. The autosampler for a chromatograph, according to claim 2, wherein
the changeable parameter item includes a count of liquid types and a type of liquid to be injected into the analysis flow path.

6. The autosampler for a chromatograph, according to claim 1, wherein
the sequence data creator is configured to create a pre-processing sequence in which an operating instruction for a pre-processing operation to be executed by the sample injector before the initial injecting operation is written and save the pre-processing sequence in the first data region.

7. The autosampler for a chromatograph, according to claim 6, wherein
the pre-processing operation includes a cleaning operation.

8. The autosampler for a chromatograph, according to claim 1, wherein
the sequence data creator is configured to create a post-processing sequence in which an operating instruction for a post-processing operation to be executed after the sample injector ends the successive injecting operation is written and save the post-processing sequence in a fourth data region, and
the controller is configured to execute the post-processing sequence in the fourth data region after a count of sample injection carried out by the sample injector reaches the set count and cause the sample injector to execute the post-processing operation.

* * * * *